(12) United States Patent
Le et al.

(10) Patent No.: US 7,543,303 B2
(45) Date of Patent: Jun. 2, 2009

(54) USE OF MULTIPLE QUEUES IN COUPLING FACILITY TO PROVIDE ZONING CAPABILITY IN A PARALLEL SYSPLEX ENVIRONMENT

(75) Inventors: Cuong M Le, Tucson, AZ (US);
Anthony S. Pearson, Tucson, AZ (US);
Glenn R. Wilcock, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 10/112,156

(22) Filed: Mar. 29, 2002

(65) Prior Publication Data

US 2003/0188038 A1 Oct. 2, 2003

(51) Int. Cl.
*G06F 9/54* (2006.01)
*G06F 9/46* (2006.01)
(52) U.S. Cl. .................. 719/314; 719/316; 718/102
(58) Field of Classification Search ................ 719/314, 719/316; 718/100, 102
See application file for complete search history.

(56) References Cited

U.S. PATENT DOCUMENTS

| 5,418,913 | A | * | 5/1995 | Fujimoto ................ 709/213 |
|---|---|---|---|---|
| 5,712,974 | A | | 1/1998 | Gainey et al. |
| 5,758,339 | A | | 5/1998 | Barton et al. |
| 5,923,890 | A | | 7/1999 | Kubala et al. |
| 6,249,800 | B1 | | 6/2001 | Aman et al. |
| 6,286,089 | B1 | | 9/2001 | Greiner et al. |
| 6,338,074 | B1 | * | 1/2002 | Poindexter et al. .......... 715/500 |
| 6,356,801 | B1 | * | 3/2002 | Goodman et al. ............ 700/214 |
| 6,647,508 | B2 | * | 11/2003 | Zalewski et al. ................ 714/3 |
| 6,738,840 | B1 | * | 5/2004 | Nouvet et al. .................. 710/52 |
| 6,874,040 | B2 | * | 3/2005 | Gregg ......................... 710/33 |
| 7,010,602 | B2 | * | 3/2006 | Poindexter et al. .......... 709/226 |
| 2002/0156897 | A1 | * | 10/2002 | Chintalapati et al. ........ 709/227 |
| 2003/0014461 | A1 | * | 1/2003 | Tanaka ....................... 709/100 |

* cited by examiner

*Primary Examiner*—Li B Zhen
(74) *Attorney, Agent, or Firm*—Scully, Scott, Murphy & Presser, P.C.; Robert Sullivan, Esq.

(57) ABSTRACT

A multiple processing architecture and a method of managing a work queue of that processing architecture. The multiple processing architecture comprises a plurality of distributed computer systems and a coupling facility. These systems are all connected to the coupling facility by a plurality of links. The coupling facility holds and manages a work queue for the applications servers; and the processing system further includes queue managing means to separate the work queue into at least a plurality of separate zones, and to associate each of a plurality of subsets of the computer systems with a respective one of said zones whereby, for each of said subsets of computer systems, all of the computer systems in the subset can place work requests on, and retrieve work requests from, the zone associated with said subset.

17 Claims, 2 Drawing Sheets

USE OF MULTIPLE QUEUES IN COUPLING FACILITY TO PROVIDE ZONING CAPABILITY IN A PARALLEL SYSPLEX ENVIRONMENT

BACKGROUND OF THE INVENTION

1. Field of the Invention

This invention, generally, relates to multi-system data processing environments; and more specifically, the invention relates to common queues in such processing environments.

2. Background Art

Over the past several years, computer manufacturers have begun to provide processing architectures based on a multi-system shared data approach. Through these architectures, multiple large-scale computer systems, each of which is often referred to as a computer processing complex (CPC) or a central electronic complex (CEC), are interconnected, through, for example, a coupling facility or other interprocessor communication mechanism, to permit each such system to gain read-write access to data residing on one or more shared input/output devices. The resulting interconnected computer system is commonly referred to as a sysplex.

In these multi-processor environments, the coupling facility, among other functions, may provide a common, or shared, task queue for the connected, distributed computer complexes. With a common queue, tasks or requests can be placed on the queue by any of the connected computer complexes, and any of the interconnected computer systems can retrieve a request from the queue for processing. In this way, the total workload of the sysplex can be distributed among all the individual computer systems. Also, a computer system of the sysplex can receive a request from a client, even though that particular system cannot itself process the request. In this case, the work request is placed on the queue for processing by one of the other systems that can process the request.

One difficulty with a common queue in the coupling facility is that it applies to the whole sysplex. In an environment having multiple, dispersed, parallel systems, not all of the dispersed systems may be able to process all requests. This may be due to the fact that some of the systems do not have the physical devices or accessories needed to perform certain tasks. For example, the tape drive required for mounting tapes may not be physically co-resident with the tape cartridge media itself.

Also, in other situations, users of the systems may need to dedicate subsets of the distributed processors for specific purposes. For instance, a user may need or want to designate one subset of the parallel systems for production purposes, and to designate a second subset for test purposes. These users may want to have a different processing queue, within the common coupling facility, for each subset of the computer complexes.

SUMMARY OF THE INVENTION

An object of this invention is to improve distributed, multiple processing systems.

Another object of the present invention is to improve coupling facilities for distributed multiple processing systems.

A further object of the invention is to allow users of a multi-system data processing architecture to zone their parallel systems by assigning different subsets of the systems to different work queues.

These and other objectives are attained with a multiple processing architecture and a method of managing the queue of that processing architecture. The multiple processing system comprising a plurality of distributed computer systems and a coupling facility. Each of the computer systems has an operating system instance resident thereon and that provides at least one application server; and these systems are all connected to the coupling facility by a plurality of links that transmit data between the computer systems and the coupling facility.

The coupling facility holds and manages a work queue for the application servers; and the processing system further includes queue managing means to separate the work queue into at least a plurality of separate zones, and to associate each of a plurality of subsets of the computer systems with a respective one of said zones whereby, for each of said subsets of computer systems, all of the computer systems in the subset can place work requests on, and retrieve work requests from, the zone associated with said subset.

With the preferred embodiment, the queue managing means manages the work queue so that for each of the subsets of computer systems, only the computer systems in the subset are able to place work requests on and to retrieve work requests from the zone associated with the queue. Also, preferably, the queue managing means is resident on the coupling facility.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
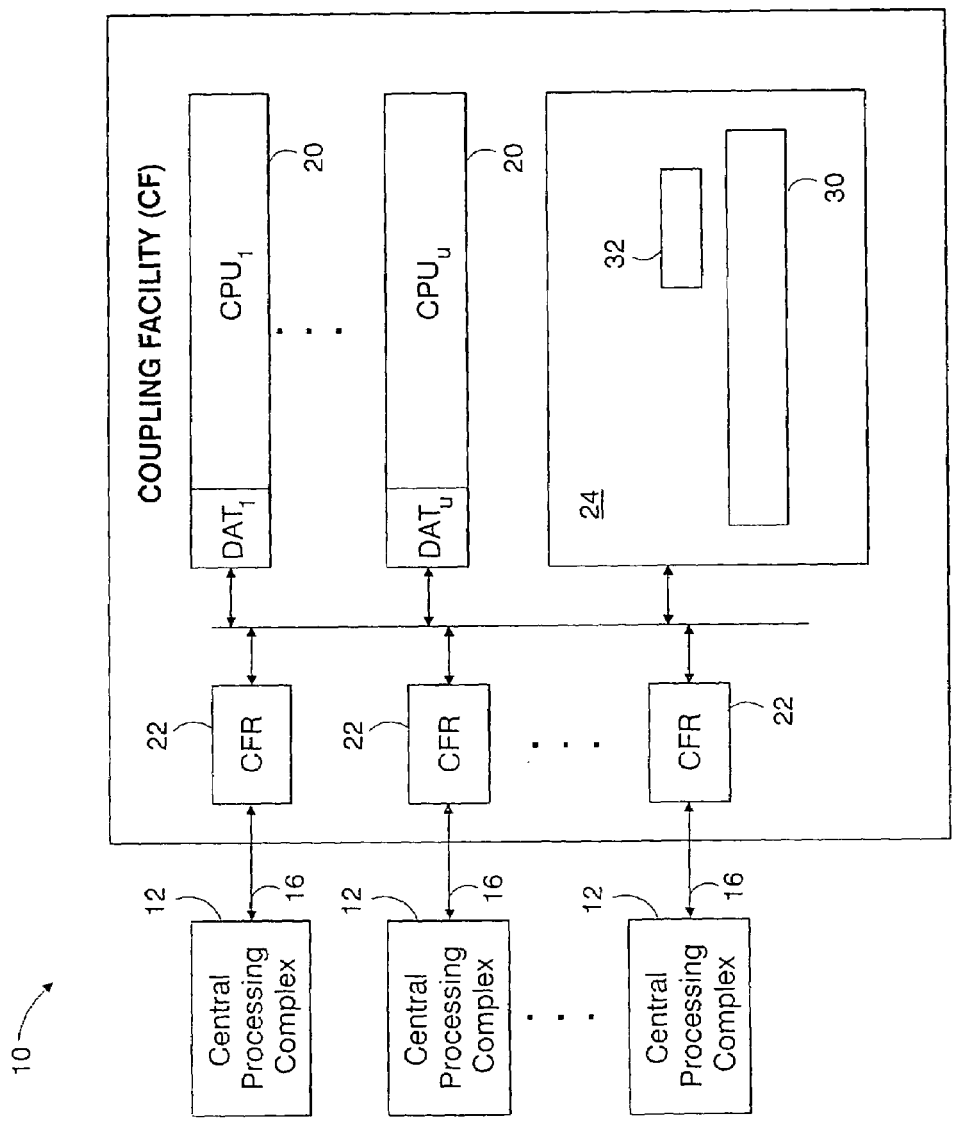
FIG. 1 depicts a block diagram representation of a geographically dispersed, parallel, multiple processing environment embodying this invention.

FIG. 1 shows a distributed, multi-system, shared data environment, or sysplex, 10. Sysplex 10 includes a multitude of central processing complexes 12 interconnected to a coupling facility 14 through inter system channels 16. Preferably, each of the central processing complexes is a computer system operating according to the S/390 architecture of International Business Machines Corp. (IBM). The S/390 architecture is well known to represent the foundation for robust, high performance. In general, though, computers of any architecture having inter-system channels can be used for the central processing complexes 12. Each of the complexes 12 operates to execute one or more processes that may share data with one or more of the other complexes. The sharing of data by two or more processes is carried out through operation of the coupling facility 14.

The coupling facility 14 includes one or more central processing units 20, receivers 22, and storage unit 24. Receivers 22 are provided to connect the coupling facility to the inter-system channels 16. The storage 14 is, typically, a large storage. Storage 14, for example, may be partitioned into control storage and non-control storage. A predetermined address location in storage 14 stores coupling facility code used for controlling the set up and operation of the coupling facility. Another predetermined address location in storage 14 stores information indicating the locations in storage that are free and hence available for allocation.

The coupling facility provides a work queue 30 for the computer complexes 12 of sysplex 10. When any complex 12 receives a message to be processed, that complex enques the message onto the shared queue. As additional messages are received by complexes 12, they too are enqued onto the shared queue. When one of the complexes 12 determines that it has the capacity to process a transaction, that complex dequeues a message from the shared queue. That system then processes the message and places on the shared queue the appropriate response to the complex that generated the incoming message.

Figure 2:
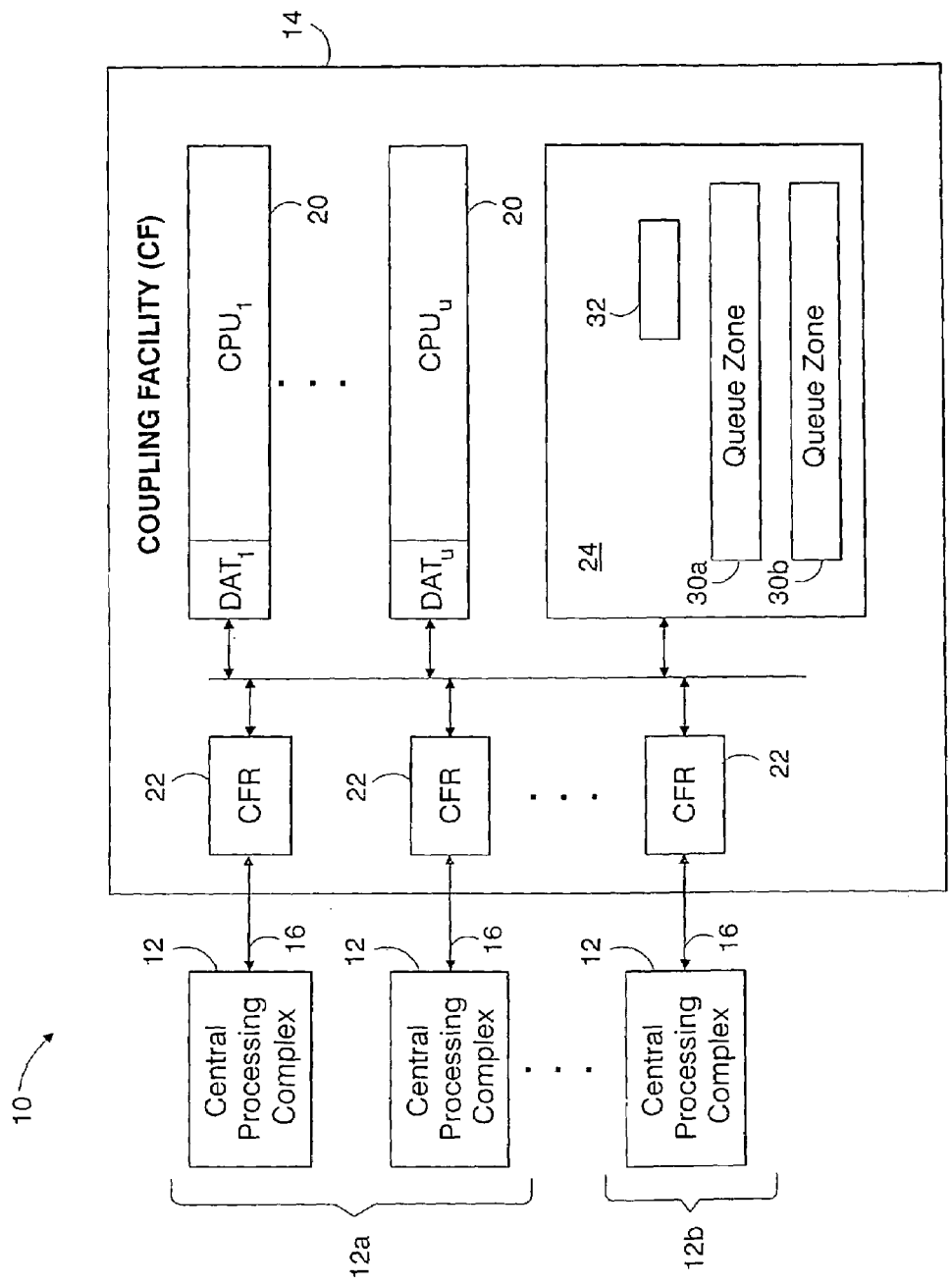
FIG. 2 shows the multiple systems of FIG. 1 separated into zones, with each zone associated with a respective one common work queue zone.

With reference to FIG. 2, coupling facility 14 includes means, schematically represented at 32, to separate the common queue 30 into at least a plurality of separate zones and, also, to associate a respective group or subset of computer complexes 12 with each of these zones. This association enables the computers of each subset to place work requests on, and to retrieve work requests from, the zone associated with the subset of computer complexes. For example, as depicted in FIG. 2, a subset 12a, including two of the computer complexes 12, is associated with queue zone 30a, and a subset 12b, including just one of the computer complexes 12, is associated with queue zone 30b.

In addition, preferably, each of the computer complexes 12 is associated with only one of the queue zones. In this way, for each subset of the computer complexes 12, all of the computer complexes in the subset, but only those complexes in the subset, can place work request on and retrieve work requests from the associated queue zone.

The computer systems 12 can be assigned to different queue zones using a variety of criteria. For example, the assignment may be based on physical aspects or limitations of the computer complexes 12 of sysplex 10. To elaborate, commonly, not all of the computer systems of a sysplex have all of the physical devices needed to perform all the functions that can be performed on the sysplex. In this case, requests for tasks can be enqued on the queue zones so that only computer complexes 12 that can perform a given task can recall task requests from the queue zone on which requests for that given task are placed. A good example of this is tape drives. For example, in a sysplex, some computer systems 12 of sysplex 10 are at one physical location, and the other computer systems 12 are at a second physical location. In this case, the tape drives will only be able to mount tape cartridge media that are physically at the same location. In this case, the computer systems at the first location would be assigned to one zone, and the computer systems at the second location would be assigned to a second zone. Tasks that require a tape at a physical location would only be placed on the common queue for that zone.

As will be appreciated by those of ordinary skill in the art, other criteria may also be used to assign computer complexes 12 to queue zones. In particular, the assignments may be based on the function or purpose of the computer, or on the physical location of the computer.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A multiple processing architecture, comprising:
a plurality of distributed computer systems, each of the computer systems having an operating system instance resident thereon and providing at least one application server;
a coupling facility holding and managing a work queue for the applications servers of the distributed computer systems;
a plurality of links connecting the distributed computer systems to the coupling facility to transmit data between the computer systems and the coupling facility; and
queue managing means to separate the work queue into at least a plurality of separate zones, and to associate each of a plurality of subsets of the computer systems with a respective one of said zones whereby, for each of said subsets of computer systems, all of the computer systems in the subset, and only computer systems in the subset, can (i) place work requests, (ii) process work requests, and (iii) retrieve responses to processed work requests, on, and only on, the zone associated with said subset;
wherein for each of said subsets of computer systems, the queue managing means prevents all of the computer systems in the subset from retrieving any work request from any of the zones not associated with said subset; and
wherein the computer systems are assigned to the subsets based on defined factors.

2. The multiple processing architecture according to claim 1, wherein none of the computer systems is in more than one of said subsets.

3. The multiple processing architecture according to claim 1, wherein the queue managing means resides in the coupling facility.

4. The multiple processing architecture according to claim 1, wherein the computer systems are assigned to subsets based on functions of the computer systems.

5. The multiple processing architecture according to claim 1, wherein for each of said subsets of computer systems, the queue managing means (i) allows all of the computer systems in the subset to place work requested on the zone associated with said subset for processing by one of the computers of said subset, and (ii) prevents all of the computer systems in the subset from placing any work requests on any of the zones not associated with said subset.

6. A method of operating a multiple processing architecture of the type having a plurality of distributed computer systems and a coupling facility, wherein each of the computer systems includes an operating system instance resident thereon and providing at least one application server, and the coupling facility holds a work queue and includes a queue managing means to mange the work queue for the applications servers of the distributed computer systems, the method comprising the steps of:
separating the work queue into at least a plurality of separate zones; and
associating each of a plurality of subsets of the computer systems with a respective one of said zones whereby, for each of said subsets of computer systems, all of the computer systems in the subset, and only computer systems in the subset, can (i) place work requests, (ii) process work requests, and (iii) retrieve responses to processed work requests, on, and only on, the zone associated with said subset;

using the queue managing means to prevent the computer systems in each of the subsets, from retrieving any work requests from any of the zones not associated with said each of the subsets; and wherein the computer systems are assigned to the subsets based on defined factors.

7. The method according to claim 6, wherein none of the computer systems is in more than one of said subsets.

8. The method according to claim 6, wherein the separating step includes the step of providing a queue managing means, residing in the coupling facility, to separate the work queues into the plurality of separate zones.

9. The method according to claim 6, wherein the computer systems are assigned to subsets based on physical devices co-resident with the computer systems.

10. The A method according to claim 6, wherein the computer systems are assigned to subsets based on functions of the computer systems.

11. The method according to claim 6, comprising the further step of:

for each of said subsets of computer systems, using the queue managing means (i) to allow all of the computer systems in the subset to place work requested on the zone associated with said subset for processing by one of the computers of said subset, (ii) to prevent all of the computer systems in the subset from placing any work requests on any of the zones not associated with said subset, and (iii) to allow all of the computer systems in the subset to retrieve processed work request from the zone associated with said subset.

12. A program storage device readable by machine, tangibly embodying a program of instructions executable by the machine to perform method steps for managing a work queue of a multiple processing architecture of the type having a plurality of distributed computer systems, wherein each of the computer systems includes an operating system instance resident thereon and providing at least one application server, and the coupling facility holds a work queue and includes a queue managing means to manage the work queue for the application servers of the distributed computer systems, said method steps comprising:

separating the work queue into at least a plurality of separate zones; and associating each of a plurality of subsets of the computer systems with a respective one of said zones whereby, for each of said subsets of computer systems, all of the computer systems in the subset, and only computer systems in the subset, can (i) place work requests, (ii) process work requests, and (iii) retrieve responses to processed work requests, on, and only on, zone associated with said subset;

using the queue managing means to prevent the computer systems in each of the subsets, from retrieving any work requests from any of the zones not associated with said each of the subsets; and wherein the computer systems are assigned to the subsets based on defined factors.

13. The program storage device according to claim 12, wherein none of the computer systems is in more than one of said subsets.

14. The program storage device according to claim 12, wherein the separating step includes the step of providing a queue managing means, residing in the coupling facility, to separate the work queues into the plurality of separate zones.

15. The program storage device according to claim 12, wherein the computer systems are assigned to subsets based on functions of the computer systems.

16. The program storage device according to claim 12, wherein said method steps further comprise:

for each of said subsets of computer systems, using the queue managing means (i) to allow all of the computer systems in the subset to place work requested on the zone associated with said subset for processing by one of the computers of said subset, (ii) to prevent all of the computer systems in the subset from placing any work requests on any of the zones not associated with said subset, and (iii) to allow all of the computer systems in the subset to retrieve processed work request from the zone associated with said subset.

17. A multiple processing architecture, comprising:

a plurality of distributed computer systems, each of the computer systems having an operating system instance resident thereon and providing at least one application server;

a coupling facility holding and managing a work queue for the applications servers of the distributed computer systems;

a plurality of links connecting the distributed computer systems to the coupling facility to transmit data between the computer systems and the coupling facility; and queue managing means to separate the work queue into at least a plurality of separate zones, and to associate each of a plurality of subsets of the computer systems with a respective one of said zones whereby, for each of said subsets of computer systems, all of the computer systems in the subset, and only computer systems in the subset, can (i) place work requests, (ii) process work requests, and (iii) retrieve responses to processed work requests, on, and only on, the zone associated with said subset;

wherein the computer systems are assigned to subsets based on physical devices co-resident with the computer system;

wherein for each of said subsets of computer systems, the queue managing means (i) allows all of the computer systems in the subset to place work requested on the zone associated with said subset for processing by one of the computers of said subset, and (ii) prevents all of the computer systems in the subset from placing any work requests on any of the zones not associated with said subset; and wherein for each of said subsets of computer systems, the queue managing means further (iii) allows all of the computer systems in the subset to retrieve responses to processed work request from the zone associated with said subset, and (iv) prevents all of the computer systems in the subset from retrieving any responses to processed work requests from any of the zones not associated with said subset.

* * * * *